(12) United States Patent
Wang et al.

(10) Patent No.: US 11,759,849 B1
(45) Date of Patent: Sep. 19, 2023

(54) SYSTEM AND METHOD OF MAKING AN ENHANCED CAST IRON CRANKSHAFT

(71) Applicant: GM Global Technology Operations LLC, Detroit, MI (US)

(72) Inventors: Liang Wang, Rochester Hills, MI (US); Qigui Wang, Rochester Hills, MI (US); Jianghuai Yang, Rochester Hills, MI (US); Kiran Mistry, Farmington Hills, MI (US); Oliver Patrick Jordan, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/823,238

(22) Filed: Aug. 30, 2022

(51) Int. Cl.
| | |
|---|---|
| *B22C 9/08* | (2006.01) |
| *B22D 25/02* | (2006.01) |
| *C22C 37/08* | (2006.01) |
| *C22C 37/10* | (2006.01) |
| *F16C 3/08* | (2006.01) |

(52) U.S. Cl.
CPC ............. *B22C 9/088* (2013.01); *B22D 25/02* (2013.01); *C22C 37/08* (2013.01); *C22C 37/10* (2013.01); *F16C 3/08* (2013.01); *B23P 2700/07* (2013.01); *F16C 2202/06* (2013.01); *F16C 2202/08* (2013.01); *F16C 2202/10* (2013.01); *F16C 2204/66* (2013.01); *F16C 2220/02* (2013.01); *F16C 2240/02* (2013.01); *F16C 2240/30* (2013.01); *F16C 2240/48* (2013.01); *Y10T 29/17* (2015.01); *Y10T 29/49286* (2015.01)

(58) Field of Classification Search
CPC .............. F16C 2240/02; F16C 2240/30; F16C 2240/48; F16C 2204/66; F16C 2220/02; F16C 2202/06; F16C 2202/08; F16C 2202/10; F16C 3/08; B23P 2700/07; B22C 9/088; C22C 37/08; C22C 37/10; B22D 25/02
See application file for complete search history.

(56) References Cited

U.S. PATENT DOCUMENTS 6,415,847 B1 * 7/2002 Baltz ....................... B22C 7/005
164/249

* cited by examiner

*Primary Examiner* — Moshe Wilensky
(74) *Attorney, Agent, or Firm* — Vivacqua Crane PLLC

(57) ABSTRACT

A method and system for manufacturing a cast iron crankshaft for a vehicle are provided. The system comprises a molding unit arranged to form a negative sand cast mold of the cast iron crankshaft. The mold comprising at least one molded cavity having a pattern with dimensions of the cast iron crankshaft. The system further comprises a feeding mechanism comprising a riser having a connector through which molten metallic material flows to the cast mold. The feeding mechanism feeds the molten metallic material at a riser connection angle in the at least one mold cavity. The riser connection angle corresponds to a connector modulus. The connector modulus is 20% greater than a cast modulus. The riser geometry corresponds to a riser modulus. The riser modulus is 20% greater than the connector modulus. The system further comprises a furnace, a cooling area, a separation unit, a controller and a power source.

16 Claims, 4 Drawing Sheets

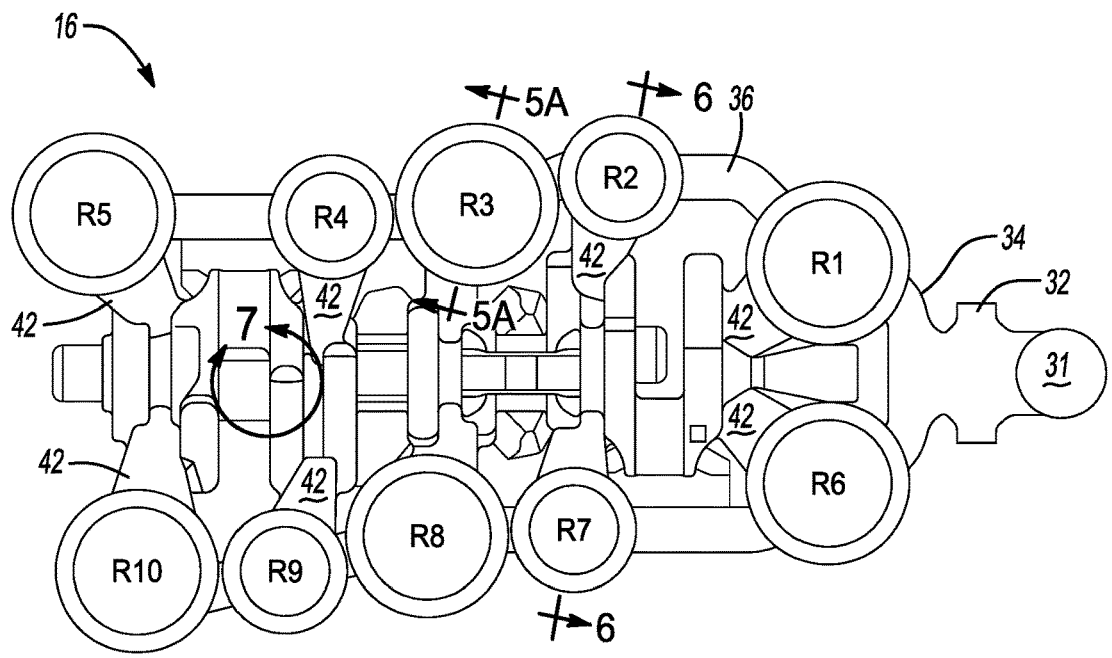
FIG. 4
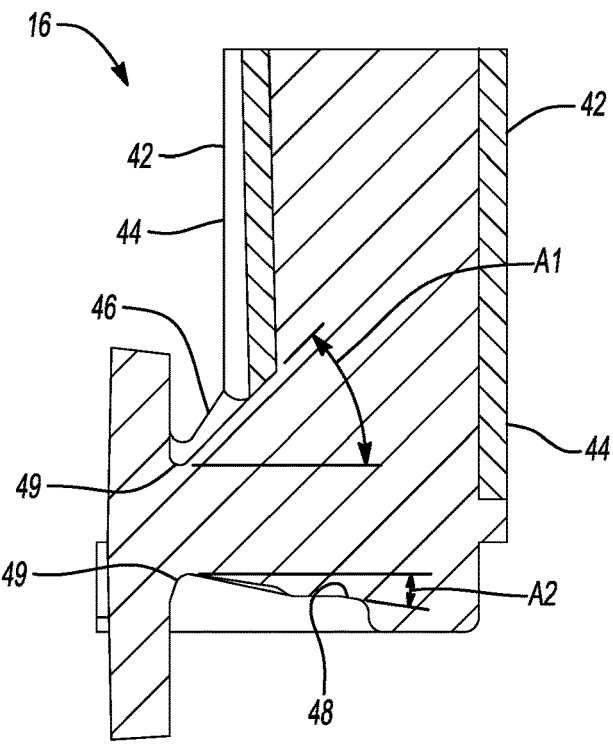
FIG. 5A
FIG. 5B
| Riser Connection Angles | | |
|---|---|---|
| Riser # | A1 | A2 |
| 1 | 45 | 10 |
| 2 | 45 | 10 |
| 3 | 55 | 10 |
| 4 | 30 | 1 |
| 5 | 45 | 10 |
| 6 | 45 | 10 |
| 7 | 45 | 10 |
| 8 | 55 | 10 |
| 9 | 35 | 1 |
| 10 | 45 | 10 |

SYSTEM AND METHOD OF MAKING AN ENHANCED CAST IRON CRANKSHAFT

GOVERNMENT LICENSE RIGHTS

This invention was made with government support under contract No. DE-EE0008877 awarded by the U.S. Department of Energy. The government has certain rights in the invention.

INTRODUCTION

The present disclosure relates to crankshafts and, more particularly, systems and methods of manufacturing cast iron crankshafts having high elasticity and high strength for vehicles.

A crankshaft is a vehicle part able to perform a conversion between reciprocating motion and rotational motion. Crankshafts may be made in numerous manners such as by way of billet, forging, and casting. Currently, the manufacture of cast iron alloy crankshafts may be improved to result in higher elasticity, higher strength, mass efficiency and cost saving.

SUMMARY

Thus, while current crankshafts achieve their intended purpose, there is a need for a new and improved system and method for manufacturing vehicular crankshafts, such as cast iron alloy crankshafts. In accordance with embodiments and examples discussed herein, the present disclosure provides systems and methods of manufacturing a vehicular cast iron alloy crankshaft having high elasticity and high strength.

In accordance with one aspect of the present disclosure, a method of manufacturing a cast iron crankshaft with high elasticity and high strength is provided. The method comprises providing a negative sand cast mold of the crankshaft. The negative sand cast mold has cavities to form the crankshaft on a horizontal plane.

In this aspect, the method further comprises providing a feeding mechanism disposed adjacent to at least one of the mold cavities. The feeding mechanism comprises a riser defining a riser geometry. The riser has a connector in fluid communication with the riser and the at least one of the mold cavities. The connector has a neck in fluid communication with the at least one mold cavity. The connector has an open end arranged to flare from the neck to the at least one of the mold cavities defining a riser connection angle relative to the horizontal plane.

The method further comprises melting a first metallic material at a predetermined temperature to define a molten metallic material and feeding the molten metallic material at the riser connection angle with the riser geometry in the cavities of the negative sand cast mold. Moreover, the riser connection angle corresponds to a connector modulus of the connector. The connector modulus is at least 10% greater than a cast modulus of the cast mold. Additionally, the riser geometry corresponds to a riser modulus of the riser. Furthermore, the riser modulus is at least 10% greater than the connector modulus.

In this aspect, the method further comprises cooling the molten metallic material at a predetermined solidification time in the negative sand cast mold to define a solidified metallic material having dimensions of the cast iron crankshaft. Furthermore, the method comprises separating the solidified metallic material from the negative sand cast mold to define the cast iron crankshaft.

In one example of this aspect, the first metallic material comprises: 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

In another example the cast modulus is: $M_{cf} = t_{cs} \times C_1 \times C_2$ where $M_{cf}$ is the feeding modulus of the cast mold, $t_{cs}$ is local solidification time at the cast mold, $C_1$ is a material constant, $C_2$ is a mold constant. In this example, $C_1 = f(T_{liquidus}, T_{mold}, T_{pour}, L, k, \rho_{metal}, \rho_{mold}, C_{pmold}, Cp_{metal})$. In this example, $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $C_{pmold}$ is a specific heat of the cast mold, and $Cp_{metal}$ is a specific heat of the molten metallic material.

Further to this example, the connector modulus is: $M_{nf} = t_{ns} \times C_1 \times C_2$ where $M_{nf}$ is the feeding modulus of the connector and $t_{ns}$ is local solidification time at the connector. Additionally, the riser modulus is: $M_{rf} = t_{rs} \times C_1 \times C_2$ where $M_{rf}$ is the feeding modulus of the riser and $t_{rs}$ is local solidification time at the riser.

In one example, the solidified metallic material has a nodular size of 1 micron to 5 microns and has a nodule count of greater than 200 nodules/mm². In another example, the solidified metallic material has a modulus of elasticity (E) of 175 GPa to 235 GPa. In yet another example, the solidified metallic material has an ultimate tensile strength (UTS) of 750 to 950 megapascal (MPa) to 1200 MPa, a yield strength (YS) greater than 450 MPa, and elongation (EL) of greater than 3%. In still another example, the solidified metallic material has a porosity of less than 10%.

In one example of this aspect, the step of feeding comprises determining the cast modulus based on a cast geometry at a first location on the cast mold. The step of feeding further comprises determining the connector modulus to define the connection angle at a second location on the connector. Furthermore, the step of feeding comprises determining the riser modulus to define the riser geometry at a third location on the riser.

In accordance with another aspect of the present disclosure, a system for manufacturing a cast iron crankshaft for a vehicle is provided. The system comprises a molding unit arranged to form a negative sand cast mold of the cast iron crankshaft on a horizontal plane. The mold comprises at least one molded cavity having a pattern with dimensions of the cast iron crankshaft. The system further comprises a furnace arranged to melt a first metallic material at a predetermined temperature to define a molten metallic material.

In this aspect, the system further comprises a feeding mechanism comprising a riser defining a riser geometry. The riser is arranged to have a connector through which the molten metallic material flows. The connector has a neck in fluid communication with the at least one mold cavity. The connector has an open end arranged to flare from the neck to the at least one mold cavity defining a riser connection angle relative to the horizontal plane.

Further to this aspect, the feeding mechanism is arranged to feed the molten metallic material at the riser connection angle with the riser geometry in the at least one mold cavity. The riser connection angle corresponds to a connector modulus of the connector. The connector modulus is 20% greater than a cast modulus of the cast mold. The riser geometry corresponds to a riser modulus of the riser. The riser modulus is 20% greater than the connector modulus.

Moreover, the system comprises a cooling area arranged to solidify the molten metallic material at a predetermined solidification time in the negative sand cast mold to define a solidified metallic material having dimensions of the cast iron crankshaft. Additionally, the system comprises a separation unit arranged to separate the solidified metallic material from the negative sand cast mold to define the cast iron crankshaft.

The system further comprises a controller in communication with the molding unit, the furnace, the feeding mechanism, and the separation unit. The controller is arranged to control the molding unit, the furnace, the pouring mechanism, and the separation unit. Furthermore, the system comprises a power source arranged to power the molding unit, the furnace, the feeding mechanism, the separation unit, and the controller.

In one embodiment of this aspect, the first metallic material comprises: 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

In another embodiment, the cast modulus is: $M_{cf}=t_{cs} \times C_1 \times C_2$ where $M_{cf}$ is the feeding modulus of the cast mold, $t_{cs}$ is local solidification time at the cast mold, $C_1$ is a material constant, $C_2$ is a mold constant. In this example, $C_1$=f ($T_{liquidus}$, $T_{mold}$, $T_{pour}$, L, k, $\rho_{metal}$, $\rho_{mold}$, $C_{pmold}$, $Cp_{metal}$). In this example, $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $C_{pmold}$ is a specific heat of the cast mold, and $Cp_{metal}$ is a specific heat of the molten metallic material.

Further to this embodiment, the connector modulus is: $M_{nf}=t_{ns} \times C_1 \times C_2$ where $M_{nf}$ is the feeding modulus of the connector and $t_{ns}$ is local solidification time at the connector. Additionally, the riser modulus is: $M_{rf}=t_{rs} \times C_1 \times C_2$ where $M_{rf}$ is the feeding modulus of the riser and $t_{rs}$ is local solidification time at the riser.

In one embodiment of this aspect, the solidified metallic material has a nodular size of 1 micron to 5 microns and has a nodule count of greater than 200 nodules/mm$^2$. In another embodiment, the solidified metallic material has a modulus of elasticity (E) of 175 GPa to 235 GPa. In yet another embodiment, the riser connection angle is between 30° and 75°.

In still another embodiment of this aspect, the system further comprises a chill member disposed on the cast mold. The chill member is formed linearly and in cooperation with the cast mold of the crankshaft.

In accordance with another aspect of the present disclosure, a cast iron crankshaft with enhanced elasticity and strength is provided. The crankshaft comprises at least four main journals aligned on a crankshaft axis of rotation defining a centerline. The crankshaft further comprises at least three pin journals. Each pin journal is disposed about a respective pin journal axis and positioned between the main journals. Moreover, each of the respective pin journal axes is oriented parallel to and spaced radially from the crankshaft axis. Each of the pin journals is joined to a pair of crank arms for force transmission between the pin journal and the pair of crank arms. Additionally, each pair of crank arms is joined to a respective main journal for transmitting torque between the pair of crank arms and the main journal. Each crank arm has a counterweight disposed opposite a respective pin journal relative to the centerline for balance and stability.

In this aspect, each main journal and each pin journal comprises a first metallic material having a porosity of less than 15 percent. Moreover, the first metallic material comprises: 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 wt % nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

In one embodiment of this aspect, the solidified metallic material has a nodular size of 1 micron to 5 microns and has a nodule count of greater than 200 nodules/mm$^2$. In another embodiment, the solidified metallic material has a modulus of elasticity (E) of 175 GPa to 235 GPa. In yet another embodiment, the solidified metallic material has an ultimate tensile strength (UTS) of 750 to 950 megapascal (MPa) to 1200 MPa, a yield strength (YS) greater than 450 MPa, and elongation (EL) of greater than 3%.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 4 is a top view of a feeding mechanism and cast mold of the system in FIG. 1 in accordance with one embodiment.

FIG. 5A is a cross sectional side view of a riser of the feeding mechanism in FIG. 4 taken along line 5-5.

FIG. 5B is a table of riser connection angles of risers in FIG. 4 in accordance with one example.

DETAILED DESCRIPTION

The following description is merely exemplary in nature and is not intended to limit the present disclosure, application, or uses.

Aspects of the present disclosure provide systems and methods of manufacturing an enhanced cast iron crankshaft for a vehicle wherein the crankshaft has high elasticity and high strength. The systems and methods provide a way to compensate for cast iron shrinkage in a cast mold during solidification in a casting process of the crankshaft. A cast modulus, a connector modulus, and a riser modulus are implemented to define riser geometry and connector angles used in a feeding mechanism to feed molten metallic material in the mold cavities of the cast mold. As a result, metal shrinkage occurs away from the cast mold in the risers.

Figure 1:
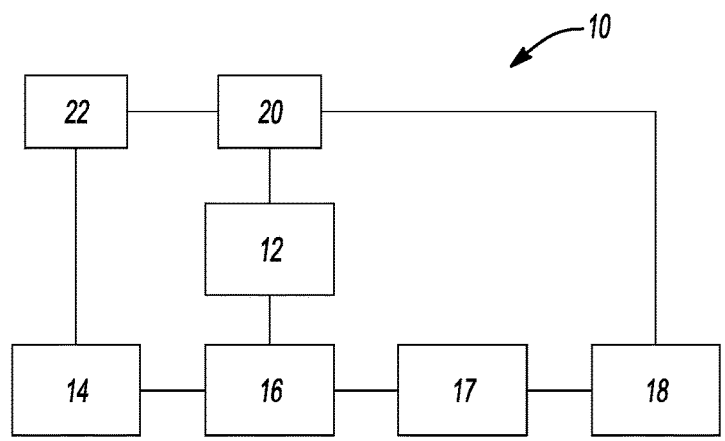
FIG. 1 is a schematic view of a system for manufacturing a cast iron crankshaft having high elasticity and high strength in accordance with one embodiment of the present disclosure.

FIG. 1 depicts a system 10 for manufacturing a cast iron crankshaft 110 (FIG. 2) with low porosity for a vehicle in accordance with one embodiment of the present disclosure. As shown, the system 10 comprises a molding unit 12 arranged to have a negative sand cast mold 30 (see FIG. 9A) of the cast iron alloy crankshaft 110. The mold 30 comprises at least one molded cavity, preferably a plurality of molded cavities, to define the crankshaft to be cast. The molding unit 12 is arranged to make the mold 30 having a pattern with dimensions of the crankshaft. In one example, the mold 30 has patterns made with green or chemically bonded sand. An assembly of core may then be disposed within the mold to further define the dimensions or structure of the pattern. It is to be understood that the mold may be made by any other suitable manner without departing from the spirit or scope of the present disclosure.

Figure 2:
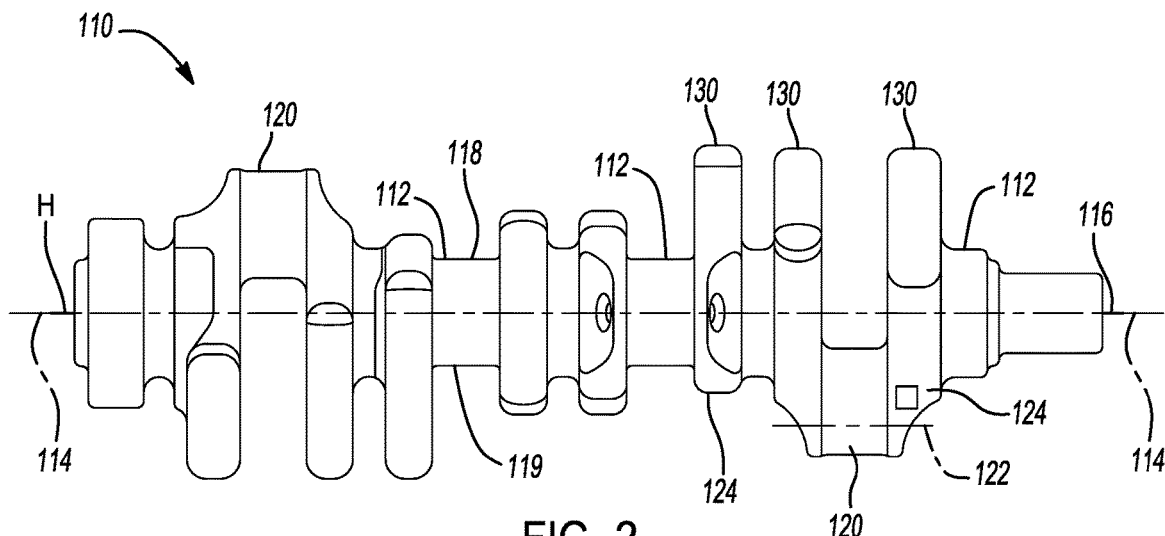
FIG. 2 is a side view of a crankshaft made by the system of FIG. 1 in accordance with one embodiment.
Figure 3:
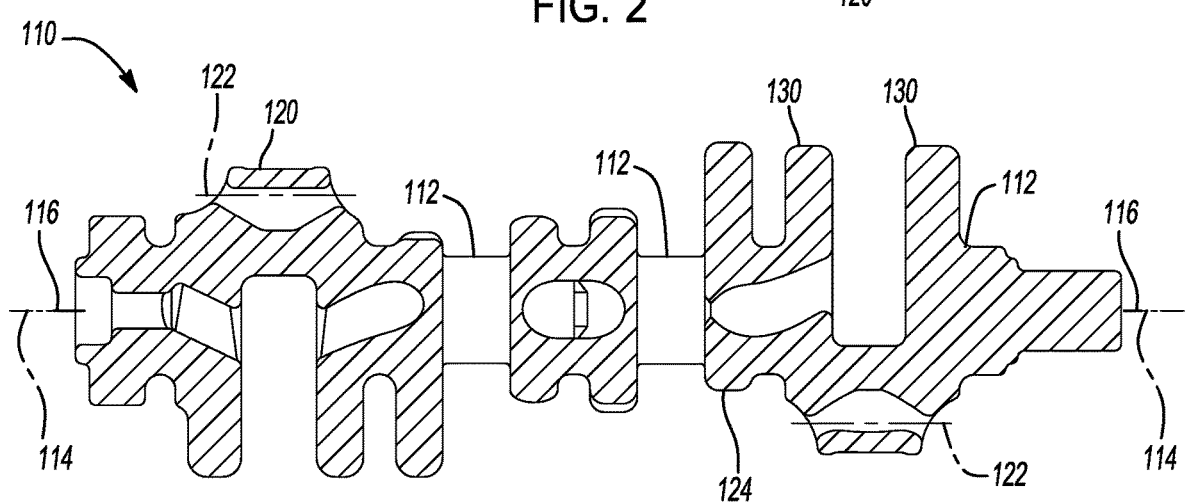
FIG. 3 is a cross sectional view of the crankshaft of FIG. 2 taken along lines 3-3.

Referring to FIGS. 2-3 as an example, the crankshaft 110 is designed or arranged to comprise at least four main journals 112 aligned on a crankshaft axis 114 of rotation defining a centerline 116 and a horizontal plane H. As shown, the centerline 116 is formed through a middle point 117 of each main journal 112 and the horizontal plane H is formed longitudinally along the centerline 116. The horizontal plane H defines a top cut half 118 and a bottom drag half 119 of the crankshaft 110.

The crankshaft 110 is designed or arranged to comprise at least three pin journals 120. As shown, each pin journal 120 is disposed about a respective pin journal axis 122 and positioned between the main journals 112. Moreover, each pin journal axis 122 is oriented parallel to and spaced radially from the crankshaft axis 114. Additionally, each of the pin journals 120 is joined to a pair of crank arms 124 for force transmission between the pin journal 120 and the pair of crank arms 124. Further, each pair of crank arms 124 is joined to a respective main journal 112 for transmitting torque between the pair of crank arms 124 and the main journal 112. In addition, each of the main journals 112, pin journals 120, and crank arms 124 is made of a first metallic material.

As depicted in FIGS. 2 and 3 as an example, at least one of the crank arms 124 is arranged to have a molded counterweight 130. Moreover, each molded counterweight 130 is disposed opposite a respective pin journal 120 relative to the centerline 116 for balance and stability. During manufacturing of the crankshaft 110, the counterweight 130 is molded to one of the crank arms.

In one embodiment, the first metallic material comprises iron or an iron alloy. Preferably, the first metallic material is made of a composition comprising 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

In one example, the first metallic material of the crankshaft has a nodular size of 1 micron to 5 microns and has a nodule count of greater than 200 nodules/mm$^2$. In another example, the solidified metallic material has a modulus of elasticity (E) of 175 GPa to 235 GPa. In yet another example, the solidified metallic material has an ultimate tensile strength (UTS) of 750 to 950 megapascal (MPa) to 1200 MPa, a yield strength (YS) greater than 450 MPa, and elongation (EL) of greater than 3%. In still another example, the solidified metallic material has a porosity of less than 10%.

Referring back to FIG. 1, the system 10 further comprises a furnace 14 for melting the first metallic material (e.g., iron) at between 1400 degrees Celsius (° C.) and 1600° C. to define a molten metallic material. In one embodiment, the furnace 14 may be charged with iron. The furnace 14 may be an electric arc furnace, an induction furnace, or any other suitable furnace without departing from the spirit or scope of the present disclosure.

As shown in FIGS. 1 and 4, the system 10 further comprises a feeding mechanism 16 arranged to feed the molten metallic material in the at least one cavity of the mold 30 defining the dimensions of the crankshaft 110 to be cast. In one example, the feeding mechanism 16 comprises a pouring ladle (not shown), a down sprue 31, a filter 32 in fluid communication with the down sprue 31, a runner 34 in fluid communication with the down sprue, 31 and at least one riser having a riser geometry in fluid communication with the runner and the at least one cavity of the mold. In this example, the feeding mechanism 16 comprises a plurality of risers R1-R10 as shown in FIG. 4.

In this example, the pouring ladle receives molten metallic material (e.g., iron) for pouring the molten metallic material in the down sprue 31 having the filter 32 to eliminate oxides from the molten metallic material. As mentioned, the down sprue 31 is in fluid communication with the runner 34 (here, a double runner with first and second wings 36, 38) through which the molten metallic material flows from the filter 32. As shown, the runner 34 is connected to the risers R1-R10 such that molten metallic material is fed thereto. As such, the runner 34 is arranged to be in fluid communication with the risers R1-R10 to which the molten metallic material is fed.

As depicted in FIGS. 4-5A, each riser, e.g. the riser R3, is arranged to have a connector 42 through which the molten metallic material flows. The connector 42 has a neck 44 in fluid communication with the at least one mold cavity. As shown in FIGS. 5A-5B, the neck 44 is arranged to flare or extend from a wall 46 of the connector 42 towards the mold 30. Moreover, the neck 44 extends to an internal base 48 wherein the internal base 48 is arranged to extend, e.g., on an incline, towards the mold 30. As shown, the neck 44 and internal base 48 extend to an open end 49 through which molten metallic material may pass to the mold 30.

In turn, the neck 44 and the internal base 48 define a general connection angle of between 30° and 75° relative to the horizontal plane. In one embodiment, the general connection angle is between 31° and 65°. In another embodiment, the general connection angle is between 30° and 55°.

Referring to FIGS. 4-5B, the neck 44 defines a first connection angle A1 and the internal base 48 defines a second connection angle A2 relative to the horizontal plane H. As it can be seen in FIG. 5B, each of the risers R1-R10 has first and second connection angles A1, A2, each of which may differ depending on dimensions of the crankshaft. For example, the riser R4 has a first connection angle A1 of 30° and a second connection angle A2 of 1°. Thereby, the riser R4 has a general connection angle of 31°. Whereas, the riser R5 has a first connection angle A1 of 45° and a second connection angle A2 of 10°. Thereby, the riser R5 has a general connection angle of 55°.

In this embodiment, each riser of the feeding mechanism 16 is arranged to feed the molten metallic material at a respective general connection angle with a respective riser geometry in at least one mold cavity, preferably all of the mold cavities. The general connection angle of each connector corresponds to a connector modulus of the connector. That is, the connector modulus defines or dictates the general connection angle at a location on the connector such that enough molten metallic material may be fed in cavities of the cast mold to compensate for shrinkage of the first metallic material in the cast mold during solidification thereof (discussed below). Thus, the connector modulus is determined to define the connection angle at a location on the connector. As a result, shrinkage occurs and undesirable imperfections form away from the cast mold in the riser.

In one embodiment, such connector modulus may be a numeric value of length (e.g., cm) which may be determined by experimentation and may depend on specifications and thermal conditions of the feeding mechanism 16 along with solidification characteristics of the first metallic material. Such specifications of the feeding mechanism 16 may include but is not limited to pouring specifications and parameters, connector specifications, riser specifications, temperature of the cast mold, temperature of the riser, temperature of the connector, and temperature of the first metallic material.

The riser geometry of each riser corresponds to a riser modulus of the riser. That is, the riser modulus defines or dictates the riser geometry such that enough molten metallic material may be fed in cavities of the cast mold to compensate for shrinkage of the first metallic material during solidification thereof (discussed below). Thus, the riser modulus is determined to define the riser geometry at a location on the riser. As a result, shrinkage occurs and undesirable imperfections form away from the cast mold 30 in the respective riser.

In one embodiment, such riser modulus may be a numeric value of length (e.g., cm) which may be determined by experimentation, and may depend on specifications and thermal conditions of the feeding mechanism 16 along with solidification characteristics of the first metallic material. Such specifications of the feeding mechanism 16 may include but is not limited to pouring specifications and parameters, connector specifications, riser specifications, temperature of the cast mold, temperature of the riser, temperature of the connector, and temperature of the first metallic material.

The cast mold has a cast geometry and specifications (including but not limited to diameter, length, height, thickness, or material composition) at a location thereof that may be accounted by a cast modulus. That is, the cast modulus may represent the cast mold at a location thereon allowing for a calculation or determination of variables (e.g. connector specifications or riser specifications) to be made on each connector and each respective riser such that enough molten metallic material may be fed in cavities of the cast mold to compensate for shrinkage of the first metallic material during solidification thereof (discussed below). Thus, the cast modulus is determined based on the cast geometry at a location on the cast mold. As a result, shrinkage occurs and undesirable imperfections form away from the cast mold in the riser.

In one embodiment, such cast modulus may be a numeric value of length (e.g., cm) which may depend on specifications and thermal conditions of the feeding mechanism 16 along with solidification characteristics of the first metallic material. Such specifications of the feeding mechanism 16 may include but is not limited to pouring specifications and parameters, cast mold specifications, temperature of the cast mold, and temperature of the first metallic material.

Preferably, the connector modulus is 20% greater than the cast modulus and the riser modulus is 20% greater than the connector modulus for enough molten metallic material to be fed in cavities of the cast mold 30 and compensate for shrinkage of the first metallic material in the cast mold 30 during solidification thereof (discussed below). As a result, shrinkage occurs and undesirable imperfections form away from the cast mold 30 in the respective riser.

In one embodiment, the cast modulus is: $M_{cf} = t_{cs} \times C_1 \times C_2$ where $M_{cf}$ is the feeding modulus of the cast mold, $t_{cs}$ is local solidification time at the cast mold, $C_1$ is a material constant, and $C_2$ is a mold constant. In this embodiment, $C_1$ may be shown as follows:

$$C_1 = f(T_{liquidus}, T_{mold}, T_{pour}, L, k, \rho_{metal}, \rho_{mold}, Cp_{mold}, Cp_{metal})$$

where $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $Cp_{mold}$ is a specific heat of the cast mold, and $Cp_{metal}$ is a specific heat of the molten metallic material.

In one example, the material constant $C_1$ may be represented as:

$$C_1 = \rho_{metal} * L \ T_{liquidus} - T_{mold} \times 2\pi \times 4k \times \rho_{mold} \times Cp_{mold} + Cp_{metal} T_{pour} - T_{liquidus} L$$

Moreover, the mold constant $C_2$ may be between about 0.50 and about 0.66.

Further to this embodiment, the connector modulus is: $M_{nf} = t_{ns} \times C_1 \times C_2$ where $M_{nf}$ is the feeding modulus of the connector and $t_{ns}$ is local solidification time at the connector. Additionally, the riser modulus is: $M_{rf} = t_{rs} \times C_1 \times C_2$ where $M_{rf}$ is the feeding modulus of the riser and $t_{rs}$ is local solidification time at the riser.

It is to be understood that determination of the cast modulus $M_{cf}$, the cast modulus $M_{cf}$, the riser modulus is: $M_{rf}$, the riser geometry, and the general connector angle may be accomplished by way of experimentation along with modules and algorithms of a software stored in a central processing unit of a computer system. Other ways may be used without departing from the spirit or scope of the present disclosure.

Figure 6:
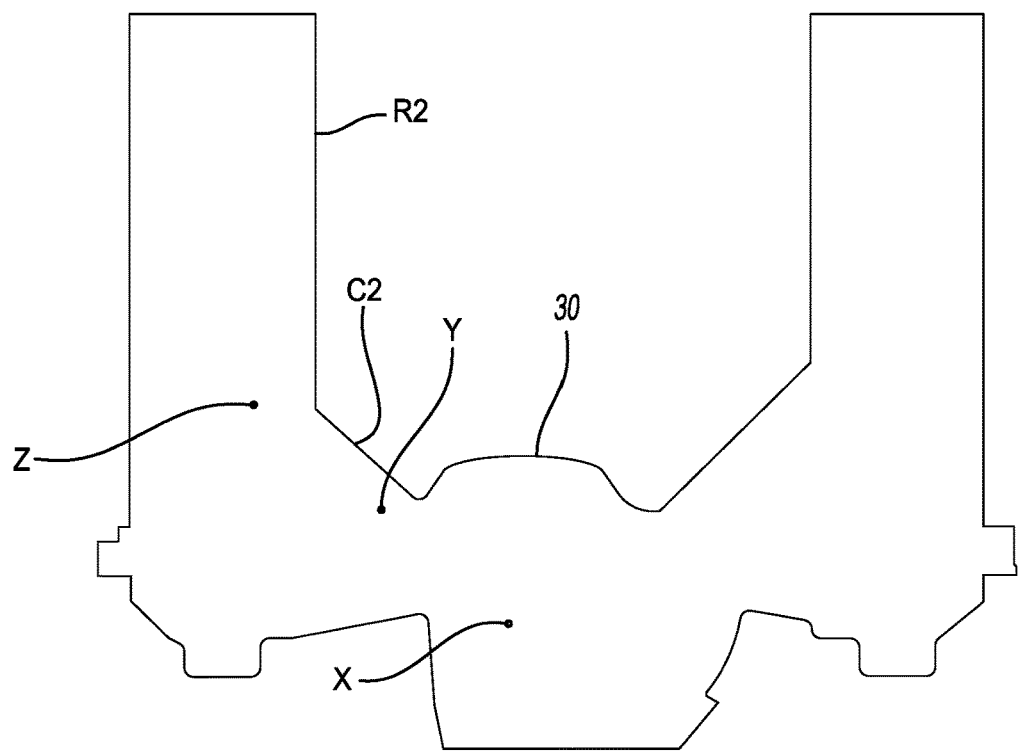
FIG. 6 is a cross sectional side view of the feeding mechanism in FIG. 4 taken along line 6-6.

FIG. 6 depicts the feeding mechanism 16 of FIG. 4 for one example of determining the cast modulus $M_{cf}$, the connector modulus $M_{nf}$, and the riser modulus $M_{rf}$. As shown, the cast modulus may represent the cast mold 30 at a location X thereon allowing for a calculation or determination of variables (e.g. connector specifications or riser specifications) to be made on a connector C2 and a riser R2 such that enough molten metallic material may be fed in cavities of the cast mold to compensate for shrinkage of the first metallic material during solidification thereof. Moreover, a connector modulus $M_{nf}$ defines or dictates the general connection angle at a location Y on the connector C2 such that enough molten metallic material may be fed in cavities of the cast mold 30 to compensate for shrinkage of the first metallic material in the cast mold 30 during solidification thereof. Additionally, the riser modulus $M_{rf}$ defines or dictates the riser geometry at a location Z in the riser R2 such that enough molten metallic material may be fed in cavities of the cast mold to compensate for shrinkage of the first metallic material during solidification thereof.

In this example, the cast modulus $M_{cf}$ of the cast mold 30 is 1.363 cm at the location X as shown in FIG. 6. Thus, the connector modulus $M_{nf}$ of the connector C2 is 1.636 cm at the location Y which is 20% greater than the cast modulus. In turn, the riser modulus $M_{rf}$ of the riser R2 is 1.963 at the location Z which is 20% greater than the connector modulus. With the connector modulus $M_{nf}$, the general connection angle at the location Y is determined (e.g., 55°). With the riser modulus $M_{rf}$, the riser geometry at the location Z is determined (e.g., 5 inches in diameter). As a result, shrinkage occurs and undesirable imperfections form away from the cast mold 30 in the riser R2 during solidification of the first metallic material.

The mold 30 may then be gated or sealed with chemically bonded sand. Thereafter, the molten metallic material is allowed to cool to about 450° C. in a designated cooling area (discussed below) to solidify the molten metallic material in the plurality of molded cavities of the mold to form a target component having dimensions of the crankshaft. Preferably, the crankshaft is made of iron comprising the composition discussed above.

Additionally, the system 10 further comprises a cooling area 17 arranged to solidify the molten metallic material. As such, the cooling area 17 solidifies the molten metallic material at a solidification time of between 5 seconds sec and 20 sec in the negative sand cast mold to define a solidified metallic material having dimensions of the cast iron crankshaft 110. In another embodiment, the solidification time is between 10 sec and 15 sec defining the solidified metallic material. During the solidification of the molten metallic material, shrinkage of the metallic material is compensated by allowing shrinkage to occur away from the cast mold 30 in the respective risers. Such compensation is due to the riser geometry and general connector angle defined by the riser modulus $M_{rf}$ and the connector modulus $M_{nf}$, respectively.

Figure 7:
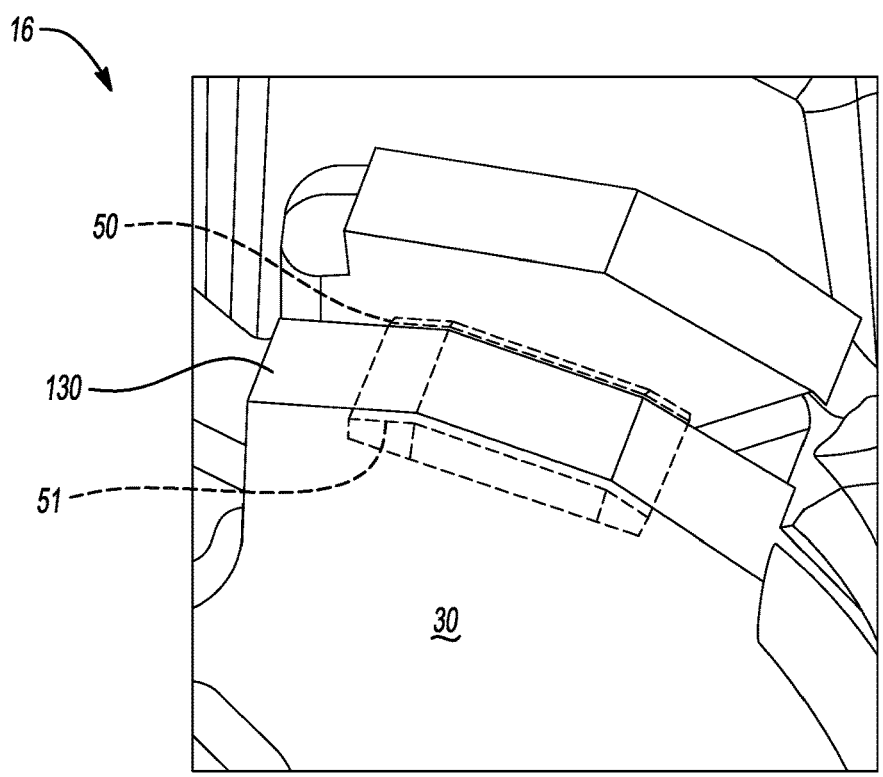
FIG. 7 is an enlarged perspective view of a crankshaft counterweight of the cast mold in FIG. 4.

To achieve a desired solidification time range, the cooling 17 area may comprise a chill member disposed on at least one counterweight of the negative sand cast mold 30. As shown in FIG. 7, a chill member 50 (in phantom) having a first side 51 is disposed on a counterweight 130 of the mold 30. When molten metallic material is fed into the cavities of the mold 30, the chill member 50 provides a more rapid cooling effect to solidify the molten metallic material to the solidified metallic material. Further referring to FIG. 7, the counterweight 130 is designed and formed to linearly complement the first side 51 of the chill member 50 for improved contact. Additionally, such design simplifies machining of the chill 50.

Referring back to FIG. 1, the system 10 further comprises a separation unit 18 for separating the target component of the crankshaft from the negative sand cast mold to define the cast iron crankshaft 110. In one embodiment, the separation unit 18 is arranged to shakeout or remove the mold comprising the chemically bonded sand from the target component. To accomplish removal of the mold from the target component, an automated unit may be used to break the mold and obtain the target component therefrom. For example, a vibration unit or table may be used having a bottom catch screen for receiving mold particles from the mold. It is to be understood that breaking the mold by any other suitable manner may be used without departing from the spirit or scope of the present disclosure.

In this embodiment, the separation unit 18 is further arranged to degate the target component after removing the mold from the target component. As known in the art, degating the target component may involve removing parts of bonded sand used to fill the mold during casting and gating.

In one embodiment, the separation unit 18 is further arranged to clean the target component after degating. In one example, a shot blast machine may be used to apply or shoot beads (e.g. metallic beads) on surfaces of the target component. To meet alloy design expectations, the separation unit 18 may also include an inspection area wherein the target component is inspected for its mechanical dimensions, mechanical properties, chemical composition, and microstructure. In one example, a computerized system such as a coordinate measuring machine (CMM) may be used to measure mechanical dimensions of the target component, defining the crankshaft 110. Any suitable methods and apparatus may be used to evaluate dimensions, mechanical properties, chemical composition, and microstructure of the crankshaft without departing from the spirit or scope of the present disclosure.

Referring back to FIG. 1, the system 10 further comprises at least one controller 20 in communication with the molding unit 12, the furnace 14, the feeding mechanism 16, and the separation unit 18. The controller 20 is configured to control the molding unit 12, the furnace 14, the feeding mechanism 16, and the separation unit 18. Furthermore, the system 10 comprises a power source 22 configured to power the molding unit 12, the furnace 14, the feeding mechanism 16, the separation unit 18, and the controller 20.

Figure 8:
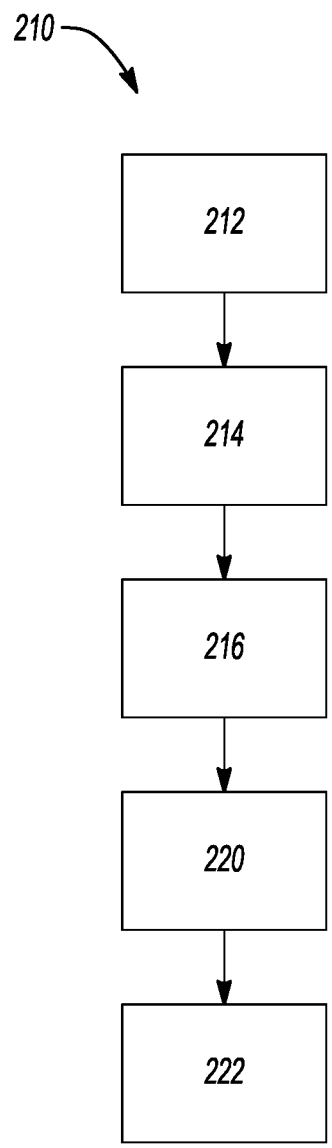
FIG. 8 is a flowchart of a method of manufacturing a cast iron crankshaft by the system in FIG. 1 in accordance with one example of the present disclosure.

FIG. 8 depicts a method 210 of manufacturing a cast iron crankshaft having low porosity for a vehicle in accordance with one example of the present disclosure. In this example, the method 210 may be implemented by the system of FIG. 1. As shown, the method 210 comprises in box 212 providing a negative sand cast mold for the cast iron crankshaft. As discussed above and shown in FIGS. 2-3, the crankshaft 110 is designed or arranged to comprise at least four main journals 112 aligned on a crankshaft axis 114 of rotation defining a centerline 116. As shown, the centerline 116 is formed through a middle point 117 of each main journal 112 and a horizontal plane H is formed longitudinally along the centerline 116. As shown, the horizontal plane H defines a top cut half 118 and a bottom drag half 119. The crankshaft 110 further comprises at least three pin journals 120.

In this embodiment, each pin journal 120 is disposed about a respective pin journal axis 122 and positioned between the main journals 112. Moreover, each pin journal axis 122 is oriented parallel to and spaced radially from the crankshaft axis 114. Additionally, each of the pin journals 120 is joined to a pair of crank arms 124 for force transmission between the pin journal 120 and the pair of crank arms 124. Further, each pair of crank arms 124 is joined to a respective main journal 112 for transmitting torque between the pair of crank arms 124 and the main journal 112.

As depicted in FIGS. 2-3 as an example, at least one of the crank arms 124 is arranged to have a counterweight 130. Moreover, each molded counterweight 130 is disposed opposite a respective pin journal 120 relative to the centerline 116 for balance and stability. During manufacturing of the crankshaft 110, the counterweight 130 is molded with the at least one of the crank arms. In addition, each of the main journals 112, pin journals 120, counterweights, and crank arms 124 are made of the first metallic material discussed above.

Further in this example, the method 210 further comprises in box 214 melting the first metallic material at between 1400 degrees Celsius (° C.) and 1600° C. to define a molten metallic material. In one example, the first metallic material may be melted by the furnace 14 discussed above. The furnace may be an electric arc furnace, an induction furnace, or any other suitable furnace without departing from the spirit or scope of the present disclosure.

The method 210 further comprises in box 216 feeding the molten metallic material at a connection angle with the riser geometry in the cavities of the negative sand cast mold. The step of feeding may be accomplished by the feeding mechanism 16 discussed above to feed the molten metallic material in the at least one cavity of the mold defining the dimensions of the crankshaft 110 to be cast. As discussed above, the feeding mechanism 16 comprises a pouring ladle (not shown), a down sprue 31, a filter 32 in fluid communication with the down sprue 31, a runner 34 in fluid communication with the filter 32 and down sprue 31, and risers R1-R10 in fluid communication with the runner 34 and the at least one cavity of the mold 30.

In one example, the connection angle is between 30° and 75°. In another example, the connection angle is between 31° and 65°. In yet another example, the connection angle is between 30° and 55°.

In this example, the pouring ladle receives molten metallic material (e.g., iron) for pouring the molten metallic material in the down sprue 31 having the filter 32 to eliminate oxides from the molten metallic material. As mentioned, the down sprue 31 is in fluid communication with the runner 34 through which the molten metallic material flows. As shown, the runner 34 is connected to the riser R1-R10 such that molten metallic material is feed thereto. As such, the runner 34 is arranged to be in fluid communication with the risers R1-R10 to which the molten metallic material is fed at a general connection angle of between 30° and 75° in the cavities of the negative sand cast mold. In one example, the connection angle is between 31° and 65°. In another example, the connection angle is between 30° and 55°.

In this example, each riser of the feeding mechanism 16 is arranged to feed the molten metallic material at a respective general connection angle with a respective riser geometry in at least one mold cavity, preferably all of the mold cavities. The general connection angle of each connector corresponds to a connector modulus of the connector. That is, the connector modulus defines or dictates the general connection angle at a location on the connector such that enough molten metallic material may be fed in cavities of the cast mold to compensate for shrinkage of the first metallic material in the cast mold during solidification thereof (discussed below). Thus, the connector modulus is determined to define the connection angle at a location on the connector. As a result, shrinkage occurs and undesirable imperfections form away from the cast mold in the riser.

In this example, such connector modulus may be a numeric value of length (e.g., cm) which may be determined by experimentation and may depend on specifications and thermal conditions of the feeding mechanism 16 along with solidification characteristics of the first metallic material. Such specifications of the feeding mechanism 16 may include but is not limited to pouring specifications and parameters, connector specifications, riser specifications, temperature of the cast mold, temperature of the riser, temperature of the connector, and temperature of the first metallic material.

The riser geometry of each riser corresponds to a riser modulus of the riser. That is, the riser modulus defines or dictates the riser geometry such that enough molten metallic material may be fed in cavities of the cast mold to compensate for shrinkage of the first metallic material during solidification thereof (discussed below). Thus, the riser modulus is determined to define the riser geometry at a location on the riser. As a result, shrinkage occur and undesirable imperfections form away from the cast mold 30 in the respective riser.

In one example, such riser modulus may be a numeric value of length (e.g., cm) which may be determined by experimentation, and may depend on specifications and thermal conditions of the feeding mechanism 16 along with solidification characteristics of the first metallic material. Such specifications of the feeding mechanism 16 may include but is not limited to pouring specifications and parameters, connector specifications, riser specifications, temperature of the cast mold, temperature of the riser, temperature of the connector, and temperature of the first metallic material.

The cast mold has a cast geometry and specifications (including but not limited to diameter, length, height, thickness, or material composition) at a location thereof that may be accounted by a cast modulus. That is, the cast modulus may represent the cast mold at a location thereon allowing for a calculation or determination of variables (e.g. connector specifications or riser specifications) to be made on each connector and each respective riser such that enough molten metallic material may be fed in cavities of the cast mold to compensate for shrinkage of the first metallic material during solidification thereof (discussed below). Thus, the cast modulus is determined based on the cast geometry at a location on the cast mold. As a result, shrinkage occurs and undesirable imperfections form away from the cast mold in the riser.

In one example, such cast modulus may be a numeric value of length (e.g., cm) which may depend on specifications and thermal conditions of the feeding mechanism 16 along with solidification characteristics of the first metallic material. Such specifications of the feeding mechanism 16 may include but is not limited to pouring specifications and parameters, cast mold specifications, temperature of the cast mold, and temperature of the first metallic material.

Preferably, the connector modulus is 20% greater than the cast modulus and the riser modulus is 20% greater than the connector modulus for enough molten metallic material to be fed in cavities of the cast mold 30 and compensate for shrinkage of the first metallic material in the cast mold 30 during solidification thereof (discussed below). As a result, shrinkage occurs and undesirable imperfections form away from the cast mold 30 in the respective riser.

In one example, the cast modulus is: $M_{cf} = t_{cs} \times C_1 \times C_2$ where $M_{cf}$ is the feeding modulus of the cast mold, $t_{cs}$ is local solidification time at the cast mold, $C_1$ is a material constant, and $C_2$ is a mold constant. In this embodiment, $C_1$ may be shown as follows:

$$C_1 = f(T_{liquidus}, T_{mold}, T_{pour}, L, k, \rho_{metal}, \rho_{mold}, Cp_{mold}, Cp_{metal})$$

where $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $Cp_{mold}$ is a specific heat of the cast mold, and $Cp_{metal}$ is a specific heat of the molten metallic material.

In this example, the material constant $C_1$ may be represented as:

$$C_1 = \rho_{metal} * L\ T_{liquidus} - T_{mold} \times 2\pi \times 4k \times \rho_{mold} \times Cp_{mold} + Cp_{metal} T_{pour} - T_{liquidus} L$$

Moreover, the mold constant $C_2$ may be between about 0.50 and about 0.66.

Further to this embodiment, the connector modulus is: $M_{nf} = t_{ns} \times C_1 \times C_2$ where $M_{nf}$ is the feeding modulus of the connector and $t_{ns}$ is local solidification time at the connector. Additionally, the riser modulus is: $M_{rf} = t_{rs} \times C_1 \times C_2$ where $M_{rf}$ is the feeding modulus of the riser and $t_{rs}$ is local solidification time at the riser.

It is to be understood that determination of the cast modulus $M_{cf}$, the cast modulus $M_{cf}$, the riser modulus is: $M_{rf}$, the riser geometry, and the general connector angle may be accomplished by way of experimentation along with modules and algorithms of a software stored in a central processing unit of a computer system. Other ways may be used without departing from the spirit or scope of the present disclosure.

As shown, the method 210 further comprises in box 220 cooling or solidifying the molten metallic material at a solidification time of between 5 seconds (sec) and 20 sec in the negative sand cast mold to define a solidified metallic material having dimensions of the cast iron crankshaft. The step of solidifying may be accomplished by the cooling area 17 discussed above to solidify the molten metallic material to the solidified metallic material. In another example, the solidification time is between 10 sec and 15 sec defining the solidified metallic material. To achieve a desired solidification time range, the cooling area 17 may comprise a chill member disposed on at least one counterweight of the negative sand cast mold. The step of solidifying may involve allowing the molten metallic material to cool to about 450° C.

During the solidification of the molten metallic material, shrinkage of the metallic material is compensated by allowing shrinkage to occur away from the cast mold 30 in the respective risers. Such compensation is due to the riser geometry and general connector angle defined by the riser modulus $M_{rf}$ and the connector modulus $M_{nf}$, respectively.

In one example, the first metallic material of the crankshaft has a nodular size of 1 micron to 5 microns and has a nodule count of greater than 200 nodules/mm². In another example, the solidified metallic material has a modulus of elasticity (E) of 175 GPa to 235 GPa. In yet another example, the solidified metallic material has an ultimate tensile strength (UTS) of 750 to 950 megapascal (MPa) to 1200 MPa, a yield strength (YS) greater than 450 MPa, and elongation (EL) of greater than 3%. In still another example, the solidified metallic material has a porosity of less than 10%.

The method 210 further comprises in box 222 separating the solidified metallic material from the negative sand cast mold to define the cast iron crankshaft. As in the system 10 of FIG. 1, to accomplish removal of the mold from the cast crankshaft, an automated unit is used to break the mold and obtain the cast iron crankshaft therefrom. For example, a vibration unit or table may be used having a bottom catch screen for receiving mold particles from the mold. It is to be understood that breaking the mold may be achieved by any suitable manner such as a vibrating unit without departing from the spirit or scope of the present disclosure.

In this example, the step of separating may comprise degating the target crankshaft casting after removing the mold from the crankshaft and cleaning the target crankshaft casting after degating. As in the system 10 of FIG. 1, a shot blast machine may be used to apply or shoot metallic beads on surfaces of the target crankshaft casting. To meet design expectations, the separation unit may also include an inspection area wherein the target crankshaft casting is inspected for its dimensions, mechanical properties, chemical composition, and microstructure. For example, a computerized system such as a CMM may be used to measure mechanical dimensions of the target crankshaft, defining the crankshaft of the present disclosure. Any suitable methods and apparatus may be implemented to evaluate mechanical dimensions, mechanical properties, chemical composition, and microstructure of the crankshaft without departing from the spirit or scope of the present disclosure.

In one example, the first metallic material comprises iron or an iron alloy. Preferably, the first metallic material is made of a composition comprising 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of manufacturing a cast iron crankshaft with high elasticity and high strength, the method comprising:
   providing a negative sand cast mold of the crankshaft, the negative sand cast mold having cavities to form the crankshaft on a horizontal plane;
   providing a feeding mechanism disposed adjacent to at least one of the mold cavities, the feeding mechanism comprising a riser defining a riser geometry, the riser having a connector in fluid communication with the riser and the at least one of the mold cavities, the connector having a neck in fluid communication with the at least one mold cavity, the connector having an open end arranged to flare from the neck to the at least one of the mold cavities defining a riser connection angle relative to the horizontal plane;
   melting a first metallic material at a predetermined temperature to define a molten metallic material;
   feeding the molten metallic material at the riser connection angle with the riser geometry in the cavities of the negative sand cast mold, the riser connection angle corresponding to a connector modulus of the connector, the connector modulus being at least 10% greater than a cast modulus of the cast mold, the riser geometry corresponding to a riser modulus of the riser, the riser modulus being at least 10% greater than the connector modulus;

cooling the molten metallic material at a predetermined solidification time in the negative sand cast mold to define a solidified metallic material having dimensions of the cast iron crankshaft; and separating the solidified metallic material from the negative sand cast mold to define the cast iron crankshaft.

2. The method of claim 1 wherein the first metallic material comprises: 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

3. The method of claim 1 wherein the cast modulus is:

$$M_{cf} = t_{cs} \times C_1 \times C_2$$

where $M_{cf}$ is the feeding modulus of the cast mold, $t_{cs}$ is local solidification time at the cast mold, $C_1$ is a material constant, $C_2$ is a mold constant, and wherein $C_1 = f(T_{liquidus}, T_{mold}, T_{pour}, L, k, \rho_{metal}, \rho_{mold}, C_{pmold}, C_{pmetal})$, where $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $C_{pmold}$ is a specific heat of the cast mold, $Cp_{metal}$ is a specific heat of the molten metallic material, wherein the connector modulus is: $M_{nf} = t_n \times C_1 \times C_2$ where $M_{nf}$ is the feeding modulus of the connector and $t_{ns}$ is local solidification time at the connector, wherein the riser modulus is: $M_{rf} = t_{rs} \times C_1 \times C_2$ where $M_{rf}$ is the feeding modulus of the riser and $t_{rs}$ is local solidification time at the riser.

4. The method of claim 1 wherein the solidified metallic material has a nodular size of 1 micron to 5 microns and has a nodule count of greater than 200 nodules/mm$^2$.

5. The method of claim 1 wherein the solidified metallic material has a modulus of elasticity (E) of 175 GPa to 235 GPa.

6. The method of claim 1 wherein the solidified metallic material has an ultimate tensile strength (UTS) of 750 to 950 megapascal (MPa) to 1200 MPa, a yield strength (YS) greater than 450 MPa, and elongation (EL) of greater than 3%.

7. The method of claim 1 wherein the step of feeding comprises:
   determining the cast modulus based on a cast geometry at a first location on the cast mold;
   determining the connector modulus to define the connection angle at a second location on the connector; and
   determining the riser modulus to define the riser geometry at a third location on the riser.

8. The method of claim 1 wherein the riser connection angle is between 30° and 75°.

9. The method of claim 1 wherein the solidified metallic material has a porosity of less than 10%.

10. A system for manufacturing a cast iron crankshaft for a vehicle, the system comprising:
    a molding unit arranged to form a negative sand cast mold of the cast iron crankshaft on a horizontal plane, the mold comprising at least one molded cavity having a pattern with dimensions of the cast iron crankshaft;
    a furnace arranged to melt a first metallic material at a predetermined temperature to define a molten metallic material;
    a feeding mechanism comprising a riser defining a riser geometry, the riser arranged to have a connector through which the molten metallic material flows, the connector having a neck in fluid communication with the at least one mold cavity, the connector having an open end arranged to flare from the neck to the at least one mold cavity defining a riser connection angle relative to the horizontal plane, the feeding mechanism arranged to feed the molten metallic material at the riser connection angle with the riser geometry in the at least one mold cavity, the riser connection angle corresponding to a connector modulus of the connector, the connector modulus being 20% greater than a cast modulus of the cast mold, the riser geometry corresponding to a riser modulus of the riser, the riser modulus being 20% greater than the connector modulus;
    a cooling area arranged to solidify the molten metallic material at a predetermined solidification time in the negative sand cast mold to define a solidified metallic material having dimensions of the cast iron crankshaft;
    a separation unit arranged to separate the solidified metallic material from the negative sand cast mold to define the cast iron crankshaft;
    a controller in communication with the molding unit, the furnace, the feeding mechanism, and the separation unit, wherein the controller is arranged to control the molding unit, the furnace, the feeding mechanism, and the separation unit; and
    a power source arranged to power the molding unit, the furnace, the feeding mechanism, the separation unit, and the controller.

11. The system of claim 10 wherein the first metallic material comprises: 2.2 weight percent (wt %) to 3.2 wt % carbon (C), 1.7 wt % to 2.3 wt % silicon (Si), 0.2 wt % to 0.6 wt % manganese (Mn), up to 0.03 wt % phosphorous (P); up to 0.02 wt % sulfur (S), 0.2 wt % to 0.6 wt % copper (Cu), 0.1 wt % to 0.4 wt % chromium (Cr), 0.4 wt % to 0.8 nickel (Ni), 0.15 wt % to 0.45 wt % molybdenum (Mo), 0.2 wt % to 1.0 wt % cobalt (Co), 0.02 wt % to 0.06 wt % magnesium (Mg), up to 0.002 wt % Rhenium (Re), 2.5 wt % to 4.0 wt % carbon equivalent, and a balance of iron (Fe).

12. The system of claim 10 wherein the cast modulus is:

$$M_{cf} = t_{cs} \times C_1 \times C_2$$

where $M_{cf}$ is the feeding modulus of the cast mold, $t_{cs}$ is local solidification time at the cast mold, $C_1$ is a material constant, $C_2$ is a mold constant, and wherein $C_1 = f(T_{liquidus}, T_{mold}, T_{pour}, L, k, \rho_{metal}, \rho_{mold}, C_{pmold}, Cp_{metal})$, where $T_{liquidus}$ is a temperature of the molten metallic material during the step of feeding, $T_{mold}$ is a temperature of the cast mold, $T_{pour}$ is a temperature of the molten metallic material during the step of melting, L is a latent heat of the molten metallic material, k is a thermal conductivity of the molten metallic material, $\rho_{metal}$ is a density of the molten metallic material, $\rho_{mold}$ is a density of the cast mold, $C_{pmold}$ is a specific heat of the cast mold, $Cp_{metal}$ is a specific heat of the molten metallic material, wherein the connector modulus is: $M_{nf}=t_{ns} \times C_1 \times C_2$
where $M_{nf}$ is the feeding modulus of the connector and $t_{ns}$ is local solidification time at the connector, wherein the riser modulus is: $M_{rf}=t_{rs} \times C_1 \times C_2$
where $M_{rf}$ is the feeding modulus of the riser and $t_{rs}$ is local solidification time at the riser.

13. The system of claim 10 wherein the solidified metallic material has a nodular size of 1 micron to 5 microns and has a nodule count of greater than 200 nodules/mm².

14. The system of claim 10 wherein the solidified metallic material has a modulus of elasticity (E) of 175 GPa to 235 GPa.

15. The system of claim 10 wherein the riser connection angle is between 30° and 75°.

16. The system of claim 10 further comprising a chill member disposed on the cast mold, the chill member being formed linearly and in cooperation with the cast mold of the crankshaft.

* * * * *